United States Patent [19]

Nettesheim et al.

[11] 4,020,138

[45] Apr. 26, 1977

[54] CAST IMPREGNATED MOLDING PLATE FOR MOLDING PRINTING PLATES

[75] Inventors: Raphael Daniel Nettesheim, New Berlin; Robert R. Guyer, Hartland, both of Wis.

[73] Assignee: Schwaab, Inc., Milwaukee, Wis.

[22] Filed: June 9, 1975

[21] Appl. No.: 584,696

[52] U.S. Cl. .............................. 264/130; 264/131; 264/135; 264/220; 264/225; 264/227; 101/401.1

[51] Int. Cl.[2] .......................................... B29C 13/04

[58] Field of Search .......... 264/135, 219, 220, 227, 264/225, 213, 255, 130, 131; 101/401.1

[56] References Cited

UNITED STATES PATENTS

| | | | |
|---|---|---|---|
| 1,531,109 | 3/1925 | Lemmon | 264/219 X |
| 2,139,054 | 12/1938 | Wilson | 264/225 X |
| 2,400,518 | 5/1946 | Kreber | 264/220 X |
| 3,145,654 | 8/1964 | Johnson | 101/401.1 |
| 3,479,952 | 11/1969 | Bernardi | 101/401.1 |
| 3,504,079 | 3/1970 | Hall | 264/227 X |

*Primary Examiner*—Richard R. Kucia
*Attorney, Agent, or Firm*—Andrus, Sceales, Starke & Sawall

[57] ABSTRACT

A molding plate for use in molding printing plates. A type-form plate bearing raised printing or indicia is coated with graphite and placed in a mold cavity with the printed surface being at an angle to the vertical and facing upwardly. A liquid thermosetting resin containing reinforcement is poured into the mold cavity and air is expelled from the upper end of the cavity. The resulting cured thermosetting resin plate has recessed printing impregnated with graphite and serves as a molding plate for forming printing plates from rubber or other materials.

7 Claims, 3 Drawing Figures

CAST IMPREGNATED MOLDING PLATE FOR MOLDING PRINTING PLATES

BACKGROUND OF THE INVENTION

In the conventional process for forming rubber stamps or printing plates, a photographic negative bearing printing or indicia is applied to a surface of a photosensitive plastic sheet. The composite structure is exposed to ultraviolet light, and the ultraviolet light causes a chemical reaction to occur in the exposed portions of the photosensitive sheet, thereby hardening the exposed portions. The remaining non-exposed portions of the sheet can be removed by etching using a caustic material, thereby resulting in a type-form sheet having a raised printing or indicia.

In the conventional process, a mold plate is formed by placing a fibrous board with a phenolic resin facing on the type form sheet. Through the application of heat and pressure, the phenolic resin will soften and conform to the raised printing, thereby forming a molding plate having recessed printing.

The molding plate is then used as a mold to form rubber stamps or printing plates of rubber or other materials.

In some cases the printing is extremely small, less than 1/32 inch, and with conventional processes, it is difficult to get full fidelity in the molding plate, with the result that the final printing is not sharply defined.

As a further disadvantage, the phenolic resin coated fiber boards can only be used up to about 5 times for forming a printing plate and then must be discarded due to the fact that the rubber being used to form the printing plate has a tendency to adhere within the grooves of the phenolic coated molding plate.

Furthermore, the phenolic resin coated fiber boards, as commonly used, have a tendency to absorb moisture, and the absorbed moisture tends to cause ink impregnated rubber to be rejected from the mold surface, thereby resulting in defective printing plates.

SUMMARY OF THE INVENTION

The invention relates to a method of making a molding plate for use in molding rubber stamps or printing plates from rubber or other materials. In accordance with the invention, a type-form sheet having a surface bearing printing or other indicia, is initially coated with graphite and the coated sheet is then placed in a mold cavity with the printed surface being located at an angle to the vertical and being spaced from a wall of the mold.

A liquid thermosetting resin, such as a polyester resin, containing glass reinforcing fibers is slowly poured into the mold cavity and air is expelled from the upper end of the cavity along the side edges. After the cavity is filled with the thermosetting resin, the resin is cured and the resulting cured resin plate has recessed printing impregnated with graphite and serves as a molding plate for subsequently forming a printing plate from rubber or other materials.

The molding plate, as prepared by the method of the invention, has greatly improved fidelity, so that the ink printing resulting from the use of the rubber stamp or printing plate is sharply defined.

The graphite coating which is impregnated into the surface of the molding plate serves a multiple function in that it acts as a release agent for releasing the molding plate from the type form sheet, it acts as a release agent in releasing the rubber printing plate from the molding plate, and it further aids in providing better fidelity for the rubber printing plate.

The thermosetting resin molding plate of the invention can be used indefinitely for the rubber will not adhere to the graphite-impregnated surface of the molding plate as it does in the case of a phenolic coated fiber molding plate.

The molding plate of the invention will not absorb moisture and therefore does not have a tendency to reject ink-impregnated rubber materials during the molding of the printing plate.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
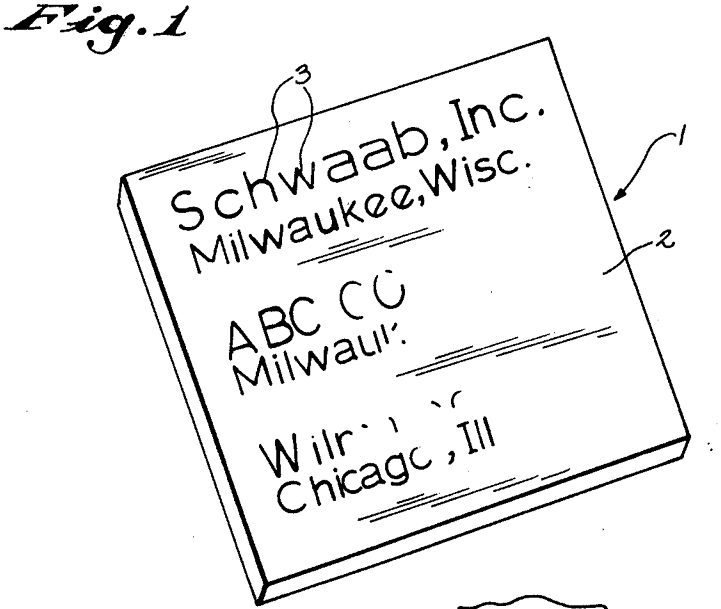
FIG. 1 is a perspective view of a molding plate produced by the method of the invention.

FIG. 1 illustrates a molding plate 1 having a surface 2 that bears recessed printing or other indicia 3. To produce the molding plate 1, a type form sheet 4 having a surface which bears raised printing or other indicia 5 is placed in the cavity 6 of mold 7. The type form sheet 4 is of standard construction and can be a laminated sheet of photosensitive plastic material on a metallic base. The raised printing 5 can be prepared by placing the photographic negative bearing the printing on the plastic surface of the type form sheet. By exposing the negative to ultraviolet light, the portions of plastic exposed through the transparent areas in the negative undergo a chemical reaction to harden the plastic, and the remaining non-exposed portions of the plastic sheet can then be etched away by using a caustic material, such as sodium hydroxide. This conventional process results in the type form sheet 1 having the raised printing or indicia 5.

The mold 7 comprises a back panel 8, a front panel 9, side walls 10, which connect the front and back panels, and a bottom wall 11. The mold has an open top 12 which extends the length of the mold.

Figure 3:
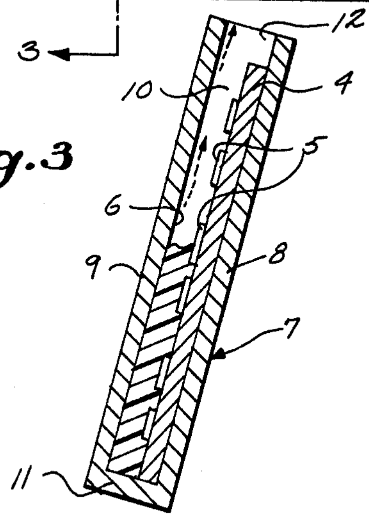
FIG. 3 is a section taken along line 3—3 of FIG. 2.

As shown best in FIG. 3, the mold is located at an angle to the vertical, generally in the range of about 10° to 20°, and the surface of the type form sheet 4 bearing the printing 5 faces upwardly and is spaced from the front panel 9.

Prior to positioning the type form sheet 4 in the mold cavity 6, the surface of the type form sheet bearing the printing 5 is coated with graphite. The graphite can be applied in the form of powder or in the form of an aqueous dispersion, in which case, the water is evaporated prior to carrying out the molding process of the invention.

In accordance with the method of the invention, a liquid thermosetting resin containing fibrous and/or particulate reinforcing material is poured through the open top 12 into the mold cavity 6 to form the molding plate 1.

The thermosetting resin can be any of the conventional thermosetting resins, such as a polyester resin, or epoxy resin.

The reinforcing material is preferably in the form of fibrous material and can be mineral fibers such as glass or asbestos; natural fibers such as cotton or wool; synthetic fibers such as nylon, polyester, or polyacrylonitrile; or metal fibers such as steel wire. Particulate material can be used in place of the fibrous reinforcing material, or in combination with the fibrous material. The particulate reinforcing material can take the form of sawdust, sand, ground shells, and the like.

The amount of reinforcing material used in the resin is not critical and preferably is used in an amount of about 5% to 50% by weight of the resin. The reinforcing material aids in preventing buckling of the cured molding plate 1 and decreases the brittleness of the plate.

It has been found that a combination of about 1 part by weight milled glass fibers, having a maximum fiber length of about ⅛ inch, to five parts of glass fibers having a length in the range of ⅛ to ½ inch to fifteen parts of resin provides a very satisfactory mixture.

The viscosity of the liquid thermosetting resin is not critical, other than the resin must be in a pourable state. The reinforcing material will increase the viscosity of the resin so that the nature and amount of reinforcing material is a consideration in providing the proper viscosity for the resin.

Figure 2:
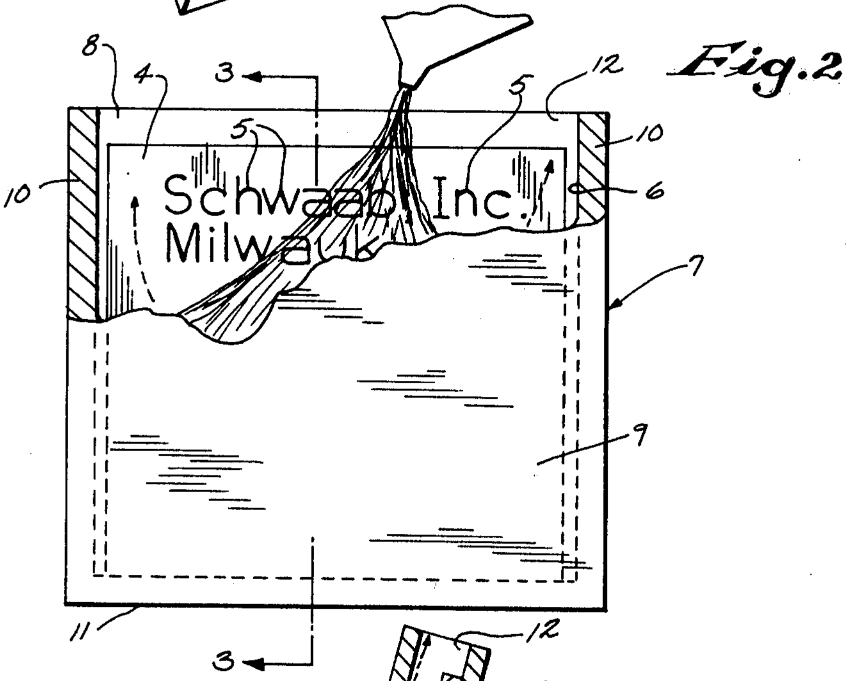
FIG. 2 is a plan view of the apparatus used in forming the molding plate.

As shown in FIG. 2, the resin is preferably poured into the central portion of the mold cavity 3 and air is expelled along the side portions of the open top 12, as indicated by the dashed lines in FIG. 2. As the printing on the type form plate is apt to be extremely small, less than 1/32 inch, in some cases, it is important that all of the air within the mold cavity be expelled, because any air bubbles, regardless of how minute, will adversely effect the fidelity of the printing on the molding plate 1. As shown in FIG. 3, the type form sheet 4, is located at an angle to the vertical and the air being expelled from the cavity 6 will flow upwardly and be discharged along the undersurface of the front panel 9, so that it will not effect the molding of the printing 5.

After the mold cavity 6 has been filled with the liquid thermosetting resin, the resin is cured to provide the fused rigid molding plate 1. While the mold can be heated to accelerate the cure, it is preferred to cure the resin at room temperature. In most operations a curing period of about 1 to 2 hours will be sufficient to cure the thermosetting resin and provide the necessary impregnation of the graphite into the surface of the molding plate 1.

After the curing period, the molding plate 1 is removed from the mold cavity and the surface 2 of the molding plate contains the recessed printing 3 corresponding to the raised printing 5 on the type form sheet 4, and the graphite will be impregnated in the entire surface 2 providing the surface with a very smooth texture.

The graphite serves a multiple function in that it acts as a release agent to release the molding plate from the type form sheet 4 after the thermosetting resin has been cured, and also acts as a release agent for releasing the rubber from the surface of the molding plate 1 during the subsequent operation of molding the rubber printing plate or rubber stamp. As a third function, the graphite provides an extremely smooth uniform surface for the molding plate which acts to greatly improve the fidelity of the molded printing plate. Not only does the molding plate of the invention have improved fidelity over conventional types of molding plates, but it is substantially more durable and can be used for an infinite number of molding operations. Furthermore, the thermosetting resin molding plate will not absorb moisture, thereby making it more suitable for use in molding of ink-impregnated materials.

Various modes of carrying out the invention are contemplated as being within the scope of the following claims particularly pointing out and distinctly claiming the subject matter which is regarded as the invention.

We claim:

1. A method of making a molding plate for use in molding a printing plate, comprising the steps of placing a type form sheet having a surface bearing raised indicia in a mold cavity with the sheet being at an acute angle to the vertical and said indicia facing upwardly, said surface being spaced from a wall of the mold to provide a clearance therebetween, applying a coating of graphite to said surface of the type form sheet, introducing a liquid thermosetting resin into said cavity with the air expelled into said clearance and being discharged from the upper end of the cavity, curing the resin to form a cured thermosetting resin molding plate having a molding surface with recessed indicia, and impregnating the graphite into the mold surface during curing of said resin.

2. The method of claim 1, and including the step of adding a reinforcing material to said liquid thermosetting resin.

3. The method of claim 1, wherein said sheet is disposed at an angle of 10° to 20° with respect to the vertical.

4. A method of forming a molding plate to be used in molding a rubber printing plate, comprising the steps of applying a coating of graphite to a surface of a type form sheet having raised indicia, placing the type form sheet in a mold cavity with said surface being disposed at an acute angle to the vertical and facing upwardly and being spaced from a wall of the mold to provide a clearance therebetween, introducing a liquid thermosetting resin containing reinforcing material into the upper end of said cavity, the air in said cavity flowing along the undersurface of said wall and being expelled from the upper end of said cavity, and curing said resin to form a molding plate having a molding surface with recessed indicia and impregnated with said graphite.

5. The method of claim 4, wherein said liquid resin is poured into the central portion of said cavity and the air is expelled from the side portions of said cavity.

6. The method of claim 4, wherein said surface is disposed at an angle of 10° to 20° to the vertical.

7. The method of claim 4, wherein the reinforcing material comprises glass fibers having a length in the range of ⅛ inch to ½ inch and said resin is a polyester resin.

* * * * *